Jan. 1, 1935. J. W. PLACE 1,986,068
HYDRAULIC GAUGE CONSTRUCTION
Filed June 11, 1932
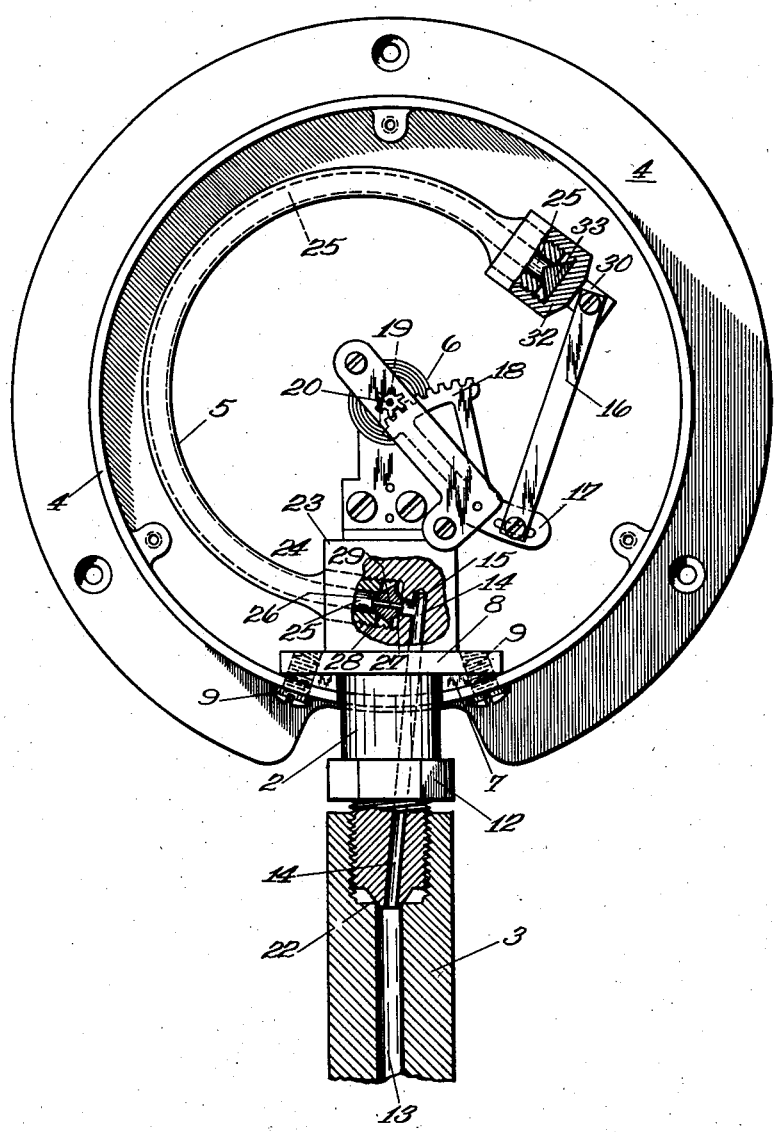
Inventor
Josiah W. Place
By
Strauch + Hoffman
Attorneys Patented Jan. 1, 1935

1,986,068

UNITED STATES PATENT OFFICE 1,986,068

HYDRAULIC GAUGE CONSTRUCTION

Josiah W. Place, West Orange, N. J., assignor to United States Gauge Company, New York, N. Y., a corporation of Pennsylvania Application June 11, 1932, Serial No. 616,694

4 Claims. (Cl. 285—156)

This invention relates to means for sealing the end of a conduit relative to the joint with which said end is connected to a second conduit or support.

The sealing means of the present invention is designed for advantageous use with that type of joint wherein the open end of a fluid conduit is wedged into rigid engagement with another member by screw threads or the like. In such type of joint some means must be provided, especially when the fluid is under high pressure, for effectively preventing the fluid from escaping from the conduit by way of the threads.

It has been proposed to seal such joints by soft internal packing, or by white lead and similar preparations or by solder. The first two of these methods are subject to the disadvantages that they cannot be relied upon to form permanently effective seals, and that the seals formed thereby may fail even in a short time where the conveyed fluid is under relatively high pressure. The third method, that of soldering, produces a fairly reliable seal under substantially all conditions, but is open to the objections that it is expensive and that the soldering heat may cause damage to some of the parts adjacent the joint. For example, when anchoring one end of a Bourdon tube and sealing the same by the conventional soldering operation, there is always the danger of inadvertently heating the tube to cause partial annealing thereof, with resultant impairment of the accuracy of the instrument and reduction of the life period of the tube.

It is the primary object of the present invention to provide an improved sealing device which has none of the disadvantages and defects pointed out above. More specifically, it is the main object of this invention to devise a simple and inexpensive sealing means which may be quickly and easily assembled in a joint and which will effectively prevent communication between the internal fluid and the threads of the joint.

It is a major object of this invention to devise an improved joint for interconnecting the fluid transmitting parts of a pressure gauge, especially of a Bourdon gauge of the high pressure hydraulic type. In this connection, it is a further important object of my invention to devise an element, for insertion in a joint of the fluid line of a pressure gauge at the inlet side of the pressure-responsive element of the latter, that has the function of effectively sealing the joint.

The foregoing and additional more specific objects will become apparent upon a study of the following description and its appended claims when taken in conjunction with the accompanying drawing, wherein:

The illustrated figure represents a face view, partially in section and with certain parts removed for clarity, of a pressure gauge embodying a preferred form of my invention, specially designed for use in hydraulic gauge constructions.

The illustrated gauge comprises a socket member 2 designed for connection at its lower end with a tubular conduit 3; a casing 4 receiving the upper end of the socket member; a Bourdon tube or spring 5 having one end anchored in the socket member; and a movement mechanism, indicated in its entirety by the numeral 6, firmly supported within the casing by the socket member and connected to the free end of the Bourdon tube. The conventional pointer, dial and bezel assembly have been removed in the drawing.

The casing has a laterally bifurcated, integral platform 7 which cooperates with a collar 8 on the member 2, and with screws 9, for rigidly mounting the socket member in position. The lower end of the latter is externally threaded for reception in the internally threaded end of the conduit 3, and is provided with a squared portion 12 designed for cooperation with a wrench so that the gauge may be tightly connected to the conduit.

The conduit 3 has a bore 13 for interconnecting a fluid pressure source (not shown) with a passageway 14 that is drilled approximately axially of the socket member 2. The upper end of this passageway is intersected by a short passage 15 adapted to transmit fluid pressures to the Bourdon tube. The latter has its free end connected to a link 16, which in turn is adjustably connected to the tail 17 of a segment 18. The segment meshes with a pinion 19 for causing oscillation of an indicator shaft 20 in response to pressure fluctuations.

The above generally described gauge, and its operation, are substantially conventional and understood. The improvements of the present invention reside in the specific connections at the two ends of the Bourdon tube and in the sealing means provided at the lower end of the socket member. Each of these features will now be described in detail.

The threaded end of the steel socket member 2 has a frustro-conical tip 22, hereafter designated as a "cone". The small diameter of this tip is less than that of the passage 13 and its base is of greater diameter than said passage whereby, as the socket member is screwed into the conduit 3, the head of the cone will partially enter the passage 13 and sealingly engage the open edge of the latter in full circular line contact. The cone preferably is hardened to a degree appreciably higher than that of the metal of the conduit 3, and hence the cone may be pressed with great force into the end of the passage to form a perfect seat for itself, if necessary, and then ensure an efficient seal even under extremely high fluid pressures.

The passageway 14 comes into communication with the bore 13 only at the flat head or tip surface of the cone, and hence fluid could escape through the threaded coupling only by way of the upper edge of the bore 13 which, however, is positively closed as above explained. The joint is thus simply and perfectly sealed. The cone may be formed as a detachable hollow element, separate from the socket member 2, as will now be apparent from a consideration of another type of joint embodied in the apparatus.

The socket member 2 derives its name from the socket 23 formed at its upper end. The socket has an internally threaded socket chamber 24 for anchoring one end of the Bourdon tube and for establishing communication between the curved internal chamber 25 of the latter and the short passage 15. A small "cone" 26, comprising a pair of integral frusto-conical sections 27 and 28, is designed for insertion in the socket in such manner that, as the Bourdon tube is screwed into and anchored in the socket, the sections 27 and 28 will be wedged into the open ends of the passages 15 and 25 respectively. The cone 26 preferably is formed of tool steel of glass hardness, and it tightly seals the circular edges of the engaged passages in substantially the same manner as the cone 22 cooperates with the passage 13. It has the further advantage, however, due to its entity and shiftability, of adapting itself to its two seats even though the latter may be imperfect or misaligned or out of parallelism. Its relatively greater hardness is a contributing factor to this automatic seating action.

The double-faced cone 26 has an axial hole 29 for interconnecting the passage 15 with the tube chamber 25. As previously pointed out, this same type of cone may be substituted for the cone formation 22 at the lower end of the socket member 2.

The movement link 16 is pivotally connected to an extension 30 of a movable socket 32. The latter is internally threaded for reception of the free end of the Bourdon tube, and in this instance the sealing element comprises a small imperforate cone 33 disposed with its base against the bottom of the socket and with its vertex projecting into the tube chamber 25. The conical surface is hard and is tightly wedged into full circular contact with the chambered edge of the tube to close the latter as well as seal the threaded joint.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein. The terms "cone" and "conical" as used in the claims do not refer only to a surface that is generated by a straight line, but are intended to include any surface of substantially or approximately conical shape, circular in cross section throughout that portion which is forced into sealing engagement with an end of a passageway.

What is claimed and desired to be secured by United States Letters Patent is:—

1. In sub-combination in a pressure gauge assembly, a tube having an axial passageway designed to receive fluid under pressure, means united by screw threads with one end of said tube, said means having an internal passageway designed for communication with said axial passageway, and a conical member wedged into circular line engagement with an end of at least one of said passageways and provided with an axial hole for interconnecting the passageways.

2. In combination in a fluid pressure gauge of the Bourdon type comprising a spring tube adapted to change its shape when subjected to pressure to indicate pressure conditions, having a working passage terminating in a relatively sharp circular edge and adapted to receive fluid under pressure, a member to which said tube is sealed against lateral pressure fluid leaks, means comprising complemental directly cooperating threads on said member and one end of said tube, respectively, for drawing said one end of said tube towards said member to securely join said tube and said member, a conical sealing device disposed between said member and said tube and mechanically independent of either, said device having a conical end designed to be forced against said circular edge for uniform circular line contact therewith.

3. In combination in a pressure gauge, internally threaded socket member forming the support for said gauge, and having a supply passage for transmitting pressure fluid, said passage terminating in a circular edge, a Bourdon tube adapted to receive fluid from said supply passage and terminating in a relatively sharp circular edge at one end of said tube, said tube having external threads adjacent said circular edge, and a sealing device disposed between said circular edges, said device having an axial passageway and opposed conical ends adapted to be forced into substantially circular line engagement with said edges when said tube is screwed directly into said socket member.

4. In combination in a pressure gauge, a Bourdon tube having a passage adapted to receive fluid pressure, said tube having screw threads on its free end and terminating in a circular edge, means to seal said free end against high pressure leaks, said means comprising an internally threaded cap to engage the threads on said tube, a sealing device disposed between said tube and said cap, said sealing device having a conical surface adapted to be forced against said circular edge when said cap is screwed on to said threaded tube, said device being mechanically independent of said cap so that said device is free to adapt its conical surface for uniform sealing line contact with said edge.

JOSIAH W. PLACE.